(12) United States Patent
Lange

(10) Patent No.: US 6,953,195 B2
(45) Date of Patent: Oct. 11, 2005

(54) SEALING DEVICE

(75) Inventor: Wolfgang Lange, Osnabrück (DE)

(73) Assignee: Frimo Group GmbH, Lotte (DE)

( * ) Notice: Subject to any disclaimer, the term of this patent is extended or adjusted under 35 U.S.C. 154(b) by 0 days.

(21) Appl. No.: 10/431,187

(22) Filed: May 7, 2003

(65) Prior Publication Data
US 2004/0000764 A1 Jan. 1, 2004

(30) Foreign Application Priority Data
May 8, 2002 (DE) .......................... 102 20 842

(51) Int. Cl.7 .................................. F16J 15/02
(52) U.S. Cl. ................ 277/637; 277/628; 277/640; 277/644; 277/645
(58) Field of Search ................ 277/628, 637, 277/640, 644, 645, 646

(56) References Cited

U.S. PATENT DOCUMENTS 3,985,365 A * 10/1976 Catanzaro .............. 277/368
4,114,901 A * 9/1978 Pot .......................... 277/646
5,476,268 A * 12/1995 Rinne ....................... 277/467
5,961,128 A * 10/1999 Klammer .................. 277/646

FOREIGN PATENT DOCUMENTS

DE  199 16 789  9/2000

* cited by examiner

Primary Examiner—Enoch Peavey
(74) Attorney, Agent, or Firm—Kenyon & Kenyon

(57) ABSTRACT

A sealing device for a gap between two adjacent machine parts, including at least one inflatable, elastically stretchable tube, which is fitted into a groove in the sidewall of one of the machine parts, and which, when inflated, may be positioned against a surface of the other machine part, which borders on the gap on the side opposite the groove, at least one end of tube (2) being provided with a circumferential, turned-inward portion (6, 16) that engages its interior, into which a supporting member (5, 15) is inserted on the inside.

20 Claims, 2 Drawing Sheets

SEALING DEVICE

BACKGROUND OF THE INVENTION

1. Field of the Invention

The invention relates to a sealing device for a gap between two adjacent machine parts, including at least one inflatable, elastically stretchable tube, which is fitted into a groove in the sidewall of one of the machine parts, and which, when inflated, may be positioned against a surface, of the other machine part, which borders the gap on the side opposite the groove.

2. Description of Related Art

Sealing devices of this kind are used, for example, in foaming tools, in which the two tool halves are of great extension. Because of that, it is difficult to close off the sealing gap between the two halves of the form, that are made of solid material, so tightly after closing that the reaction mixture that was put in in the liquid state cannot get out and pollute the environment.

A sealing device of this kind is known from DE 199 16 789 C1. The sealing tubes described there are accommodated at both ends in molded parts made of a solid material, which in their area have a sealing function with respect to the sealing gap at the same time. At least one of the filler pieces is furnished with a duct-shaped recess through which compressed air may be blown into the tube or let out of it. That is what makes it possible to bring the inflated tube, over its whole length, into engagement with the surface of the forming tool lying opposite, and to seal the sealing gap over this length. This has no influence on the immediate area of the molded part. Therefore, leakage can occur at that place. For that reason, the known sealing device is not suitable for applications in which the sealing gap has to be sealed over its entire length. For instance, for the production of complex foam members in which, even in the end regions of the sealing tubes, very precise sealing is to be achieved, a new solution is being sought.

A further disadvantage of the known solution is that the molded parts partially have to project over the surfaces of the machine parts in order to achieve sealing that is as good as possible. Thus, they often form an interference for secondary members which are inserted parallel to the surface of the machine part when the forming tool is open. This is often the case, for example, for inserts which may act to reinforce plastic foam parts to be manufactured. Thus the above molded parts in these cases impair the accessibility to the forming tool.

SUMMARY OF THE INVENTION

It is an object of the invention to create a sealing device which ensures a secure seal even at the ends of the tubes. It is another object of the invention to provide a sealing device which is as simple as possible in its construction, does not require a special manufacturing expenditure and is able to be used for many applications.

These and other objects of the invention are achieved with a sealing device wherein at least one end of the tube is circumferentially turned inward and engaging with the inside of the tube, and into the inside of that, a supporting member is fitted. This new sealing device makes possible a design of the sealing tube in which the sealing tube ends no longer have to be bent over, but rather, the sealing tube end may simply be placed running straight ahead in the sealing groove all the way to its end. By the turning inside or folding over to the inside of the tube at its ends it is achieved that the tube is inflatable all the way to its outermost end. The end turned inside is pressed against the supporting member when pressure is applied using compressed air. The outer part of the tube is inflated outwards over its whole length, and thereby is made to lie sealingly against the opposite surface. End pieces, as belong to the related art, are not required.

BRIEF DESCRIPTION OF THE DRAWINGS

The invention will be described in greater detail with reference to the following drawings wherein.

DETAILED DESCRIPTION OF THE INVENTION

In the preferred embodiment, the turned-inward portion is executed in such a way that it ends as a protuberance which axially overlaps the end face of the supporting member facing the end of the tube in at least one first subsection bordering the gap. In an especially preferred embodiment, the protuberance is placed in such a way that the end face overlaps axially farther in the first subsection than in a second subsection that does not border on the gap, the elastic tube being cut back in the area of the bottom of the groove so as to allow enough room for pipe 9 in the interior of the tube 2. In this context, the first subsection is able to be placed against the surface of the other machine part that is to be sealed, whereas the second subsection faces towards the groove floor of the groove of the first machine part which accommodates the tube. The offset of the second subsection of the protuberance may be manufactured so that there is a gap from the end face of the supporting member. This design of the turned-inward portion makes possible the use of an air hose nozzle as the supporting member which is furnished with a supply connection that reaches beyond the end face of the air hose nozzle. This supply connection is connected to a pipe which is guided to an adaptor. This adaptor may be accommodated in the first machine part, offset by 90°.

After the insertion of the supporting member into the portion that is turned toward the inside, in order to ensure a secure inflatability of the tube even in the range of the portion that is turned toward the inside, it has proven advantageous for the tube to be furnished on the inside, at least at that place, with ribs or grooves distributed in the circumferential direction. After the turned-inward portion, the gaps between the ribs and the tube wall or in the grooves form flow channels through which flow media under pressure, such as compressed air, are able to penetrate the gap and inflate the tube in the range of the portion turned inward.

It is favorable if the first tube is elastic both in the radial and the axial direction, so that, when it is inflated, it is able to fully adapt to the machine parts surrounding it.

Figure 1:
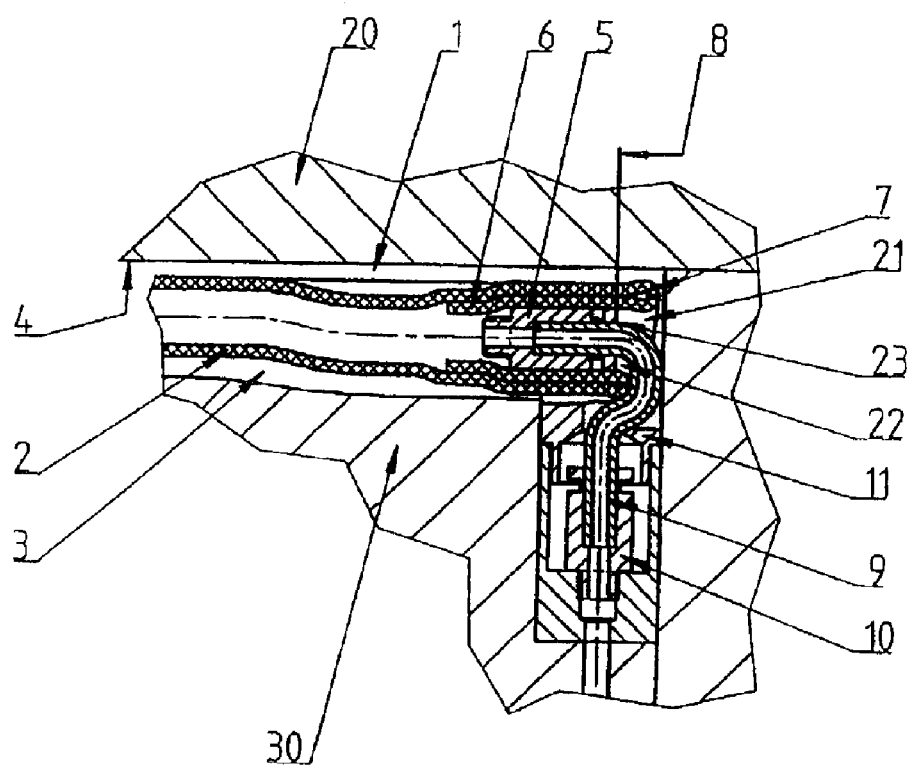
FIG. 1 is a cross-sectional view of a sealing device in accordance with the invention, showing a tube end having a compressed air supply.
Figure 2:
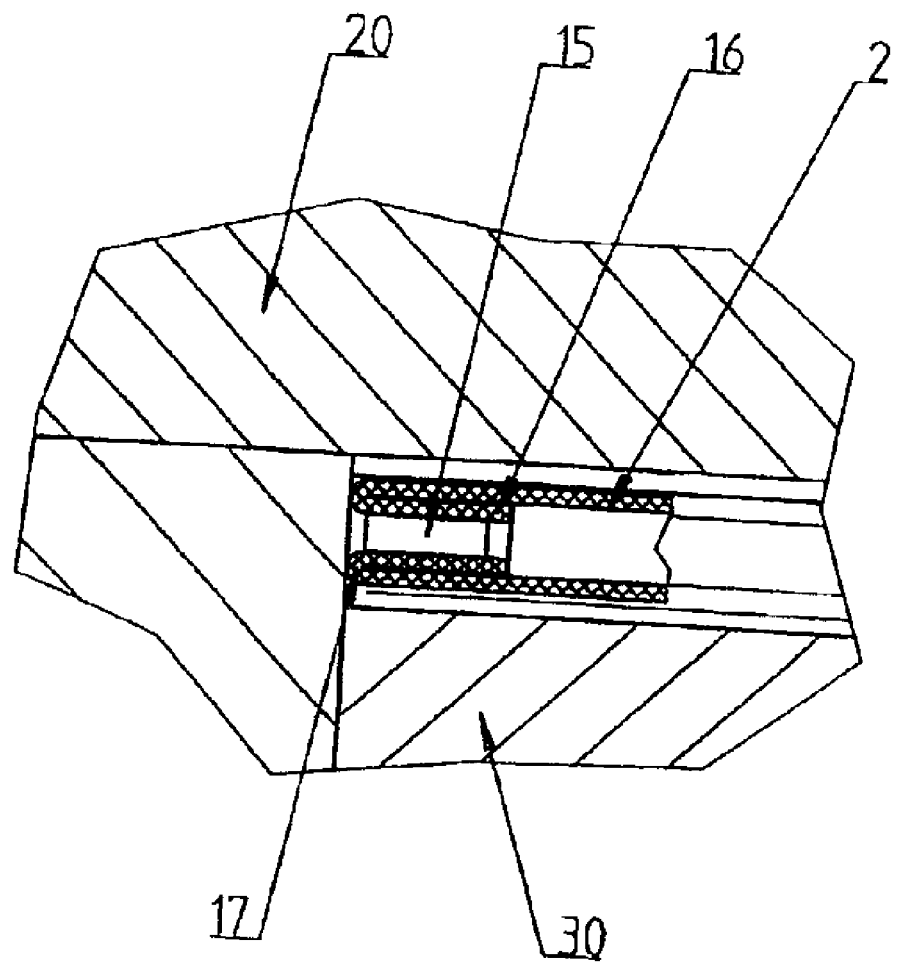
FIG. 2 shows a dead end of an end of the tube of the sealing device.

The principle of the construction of the sealing device is shown in FIGS. 1 and 2, in section and enlarged. The sealing device is intended to seal gap 1 between adjacent machine parts 20 and 30. The main component of the sealing device is tube 2, which is inserted into groove 3 in machine part 30. Tube 2 is shown in the non-inflated state. When filled with compressed air, tube 2 lies with its outer wall adjacent to the walls of groove 3 of machine part 30, and to surface 4 of machine part 20. In FIG. 2 a dead end of an end of the tube is shown, while in FIG. 1 a tube end having a compressed air supply is shown. The tube ends are turned over toward the inside, and a supporting member 5 or 15 is inserted into the turned-inward portions 6 or 16 respectively. After the inflation of tube 2, this lies completely against its bordering surfaces, and complete sealing is achieved over the entire length. The tube ends lie firmly against machine part 30 with their protuberances 7 and 17.

In order to make possible the air supply via supporting member 5 into tube 2, as may be seen in FIG. 1, turned-inward portion 6 is designed so that it terminates in a protuberance 7, which axially overlaps supporting member 5 in region 21 bordering on machine part 20. As shown in FIG. 1, it is possible that second subsection 22 of protuberance 7 also overlaps end face 8 of supporting member 5. The different design of protuberance 7 permits introducing pipe 9, which is connected to supporting member 5. Supporting member 5 has a bore inside, through which compressed air is able to reach the inside of tube 2. Supporting member 5 is here developed as an air hose nozzle which has supply connection 23. Pipe 9 is fitted into adaptor 10, which is connected to a compressed air source. On adaptor 10 there is a distancing piece 11, which protects tube 2 from sharp edges and from excessive inflation.

Supporting member 5 having the compressed air supply is slightly larger than supporting member 15. In order to accommodate this enlarged supporting member 5, groove 3 is widened slightly at its outgoing end, as may be seen in the drawing.

It can be seen that air may be pressed each and every time to the interior of the tube 2 or it may exhaust. If pressed to the interior, the tube 2 is blown up and pressed against the superior part 20 of the die as well as against the axial border of the groove 3. These movements are only breathing movements, and their purpose is to tighten the gap between the bottom and the cover part of the die.

The selection of the material for the supporting members and also for the pipe and adaptor 10 depends on locally available conditions. One should ensure that tube 2 is inflated rapidly and reliably, and that, after execution of the foaming procedure, it is able to be emptied of compressed air again.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A sealing device for a gap between two adjacent machine parts, comprising: at least one inflatable, elastically stretchable tube which is capable of being fitted into a groove in a sidewall of one of the machine parts, and which, when inflated, may be positioned against a surface of the other machine part, the surface bordering the gap on the side opposite the groove, wherein at least one end of the tube (2) is provided with a circumferential, turned-inward portion (6, 16) engaging in its interior, a supporting member (5, 15) being inserted inside the turned-inward portion, wherein the turned-inward portion is positioned between the tube and the supporting member and contacts an innermost portion of the tube when not inflated, wherein the turned-inward portion provides a first exterior portion directly overlapping a second inner portion along an entire linear length of the turned inward portion.

2. The sealing device according to claim 1, wherein the turned-in portion (6, 16) ends in a protuberance (7, 17) which axially overlaps an end face (8), of the supporting member (5) in at least one first subsection (21) bordering on the gap (1).

3. A sealing device for a gap between two adjacent machine parts, comprising: at least one inflatable, elastically stretchable tube which is capable of being fitted into a groove in a sidewall of one of the machine parts, and which, when inflated, may be positioned against a surface of the other machine part, the surface bordering the gap on the side opposite the groove, wherein at least one end of the tube (2) is provided with a circumferential, turned-inward portion (6, 16) engaging in its interior, a supporting member (5, 15) being inserted inside the turned-inward portion wherein the turned-in portion (6, 16) ends in a protuberance (7, 17) which axially overlaps an end face (8), of the supporting member (5) in at least one first subsection (21) bordering on the gap (1), wherein the protuberance (7) axially overlaps the end face (8) in the first subsection (21) to a greater extent than in a second subsection (22) that does not border on the gap (1).

4. The sealing device according to claim 3, wherein, in the second subsection (22), the protuberance (7) is designed to be set back so as to leave a separation behind the end face (8) of the supporting member (5) facing the end of the tube (2).

5. The sealing device according to claim 1, wherein the supporting member (5) is designed as an air hose nozzle.

6. The sealing device according to claim 2, wherein the supporting member (5) is designed as an air hose nozzle.

7. The sealing device according to claim 3, wherein the supporting member (5) is designed as an air hose nozzle.

8. The sealing device according to claim 4, wherein the supporting member (5) is designed as an air hose nozzle.

9. The sealing device according to claim 5, wherein the air hose nozzle is provided with a supply connection (23) extending past its end face (8).

10. The sealing device according to claim 6, wherein the air hose nozzle is provided with a supply connection (23) extending past its end face (8).

11. The sealing device according to claim 7, wherein the air hose nozzle is provided with a supply connection (23) extending past its end face (8).

12. The sealing device according to claim 9, wherein the supply connection surrounds a pipe (9).

13. The sealing device according to claim 10, wherein the supply connection surrounds a pipe (9).

14. The sealing device according to claim 11, wherein the supply connection surrounds a pipe (9).

15. The sealing device according to claim 12, wherein the pipe (9) terminates in an adapter (10) and is protected by a distancing piece (11).

16. The sealing device according to claim 1, wherein the tube (2) is provided on the inside with ribs or grooves distributed in the circumferential direction.

17. The sealing device according to claim 2, wherein the tube (2) is provided on the inside with ribs or grooves distributed in the circumferential direction.

18. The sealing device according to claim 3, wherein the tube (2) is provided on the inside with ribs or grooves distributed in the circumferential direction.

19. The sealing device according to claim 1, wherein the tube (2) is stretchable in the radial and in the axial direction.

20. The sealing device according to claim 2, wherein the tube (2) is stretchable in the radial and in the axial direction.

* * * * *